(12) United States Patent
Hargreaves et al.

(10) Patent No.: US 8,294,671 B1
(45) Date of Patent: Oct. 23, 2012

(54) COMPUTER PERIPHERAL WITH REMOVABLE ACTIVE ELEMENT CARTRIDGE

(75) Inventors: William Rudolph Hargreaves, Bellevue, WA (US); Carsten Buus, Snohomish, WA (US); Mark Shintaro Ando, Seattle, WA (US)

(73) Assignee: Kinesis Corporation, Bothell, WA (US)

( * ) Notice: Subject to any disclaimer, the term of this patent is extended or adjusted under 35 U.S.C. 154(b) by 243 days.

(21) Appl. No.: 12/691,555

(22) Filed: Jan. 21, 2010

Related U.S. Application Data

(60) Provisional application No. 61/146,175, filed on Jan. 21, 2009.

(51) Int. Cl.
*G09G 5/08* (2006.01)
(52) U.S. Cl. ........................................................ 345/157
(58) Field of Classification Search .......... 345/163–168, 345/156–158, 184; 200/251, 332.1
See application file for complete search history.

(56) References Cited

U.S. PATENT DOCUMENTS

| | | | | |
|---|---|---|---|---|
| 4,464,652 A * | 8/1984 | Lapson et al. | ............... | 345/165 |
| 4,559,532 A * | 12/1985 | Hosogoe | ....................... | 345/164 |
| 5,260,696 A * | 11/1993 | Maynard, Jr. | .................. | 345/163 |
| 5,319,996 A * | 6/1994 | Harris | ........................... | 200/339 |
| 5,486,845 A * | 1/1996 | Chait | ............................ | 345/163 |
| 5,635,777 A * | 6/1997 | Telymonde et al. | .......... | 307/119 |
| 5,751,274 A * | 5/1998 | Davis | ............................ | 345/157 |
| 5,805,142 A * | 9/1998 | Byrne | ........................... | 345/163 |
| 5,870,081 A * | 2/1999 | Wu | ................................. | 345/163 |
| 5,886,685 A * | 3/1999 | Best | ............................... | 345/163 |
| 6,360,630 B2 * | 3/2002 | Holtorf | ........................ | 200/86.5 |
| 6,373,470 B1 * | 4/2002 | Andre et al. | ................... | 345/166 |
| 6,452,123 B1 * | 9/2002 | Chen | ............................. | 200/86.5 |
| 6,611,250 B1 * | 8/2003 | Prince et al. | ................... | 345/163 |
| 6,690,359 B1 * | 2/2004 | Felton | ............................ | 345/163 |
| 6,740,830 B2 * | 5/2004 | Sato et al. | ..................... | 200/343 |
| 6,933,925 B1 * | 8/2005 | Gibbons et al. | ............... | 345/163 |
| 7,009,597 B1 * | 3/2006 | Ames | ............................ | 345/163 |
| 7,227,533 B2 * | 6/2007 | Hong | ............................ | 345/163 |
| 7,946,986 B2 * | 5/2011 | Bockenstedt et al. | ........ | 600/437 |
| 2001/0026266 A1 * | 10/2001 | Schena et al. | ................. | 345/163 |
| 2003/0214483 A1 * | 11/2003 | Hammer et al. | .............. | 345/163 |
| 2005/0116933 A1 * | 6/2005 | Huang et al. | .................. | 345/163 |
| 2006/0132439 A1 * | 6/2006 | Zhou | ............................ | 345/163 |
| 2006/0192756 A1 * | 8/2006 | Cao et al. | ...................... | 345/163 |
| 2006/0227108 A1 * | 10/2006 | Meyer et al. | .................. | 345/163 |
| 2006/0284844 A1 * | 12/2006 | Yen et al. | ...................... | 345/163 |
| 2007/0152970 A1 * | 7/2007 | Chen et al. | .................... | 345/163 |
| 2010/0020016 A1 * | 1/2010 | Monahan | ...................... | 345/164 |
| 2010/0085305 A1 * | 4/2010 | Yang | ............................. | 345/163 |

* cited by examiner

*Primary Examiner* — Briggitte R Hammond
(74) *Attorney, Agent, or Firm* — Seed IP Law Group PLLC

(57) ABSTRACT

A peripheral device includes at least one active or trigger element housed in a cartridge that is removably mounted. A user can easily remove the cartridge with the active or trigger elements without using special tools. In some embodiments, the peripheral device can include a leveling member between a detection switch and a triggering interface to facilitate effective actuation of the triggering interface and activation of the detection switch from regions spaced from the detection switch. Some embodiments can include silencing or dampening features or structures to minimize or substantially eliminate sound generated upon activation of the triggering interface.

10 Claims, 18 Drawing Sheets

COMPUTER PERIPHERAL WITH REMOVABLE ACTIVE ELEMENT CARTRIDGE

BACKGROUND

1. Technical Field

The present disclosure generally relates to peripherals for electronic devices, and more particularly, to a computer peripheral, more specifically an input device such as a foot pedal and/or foot and/or hand mouse, with active elements and/or structural features which are removable and/or adjustable.

2. Description of the Related Art

The drawbacks of existing non-cartridge foot pedals relate in part to the production inefficiencies of rigidly-set configurations. Pedals cannot be easily assembled as a general purpose subassembly and then configured for different uses and markets as needed. Users also experience drawbacks with the existing non-cartridge foot pedal due to the difficulty in carrying out repairs or changes in the field. For example, one conventional foot pedal family includes models using three different types of cables (short 2-pin connector, long miniphono connector, long RJ11 connector) and two different types of switches (waterproof, non-waterproof). Furthermore, spring biasing forces or spring constants for a spring in this device can vary for different markets. It is impossible to accurately predict inventory requirements for each type and inefficient to order all these different versions to be configured by suppliers. Typically, cables and switches may be provided by one supplier and pedals from a different supplier. It is both difficult and time consuming to disassemble and reconfigure a conventional pedal for a different configuration.

Pedals normally must be designed to hold up under the force and impact of many foot actions, so they are not primarily designed for easy disassembly. In fact, this strength requirement makes foot pedals inherently difficult to take apart. Also this requirement to resist many impacts has led historically to bulky, high-profile designs. Low-profile foot pedals are more ergonomic and thus more desirable in that less bending of the ankle is required while resting and triggering it. Stronger modern materials and manufacturing processes allow low-profile designs which may be functionally and aesthetically preferred by users, but such pedals may nonetheless twist if pressed on an edge or corner, and thus fail to trigger properly, preventing the evolution of desirable modern designs.

Furthermore, some conventional pedals have mechanisms to adjust travel distance, which would simultaneously, and often undesirably, change biasing force. If it were desired to change biasing force in a conventional pedal, simply changing the spring, for example, would be difficult because of the difficulty of disassembly. If biasing force were made adjustable, it has not been possible to change force independent of travel distance with a compact, self-contained device. Additionally, conventional pedals are noisy to operate, which is not desirable in some operational environments such as an office or medical setting.

In addition, conventional peripheral triggering devices such as foot pedals and foot and/or hand mouse generated triggering noises on both down and upstrokes that are distracting and can cause wearing of components. Furthermore, conventional devices that have attempted triggering in regions spaced from the location of internal switches that detect triggering, such as in corners of a pedal or mouse trigger, typically result in inadequate activation of the switches.

BRIEF DESCRIPTION OF THE SEVERAL VIEWS OF THE DRAWING(S)

FIG. 1 is a top front perspective view of a peripheral device according to one embodiment.

FIG. 2 bottom rear perspective view of the peripheral device of FIG. 1.

BRIEF SUMMARY

A peripheral device according to one embodiment includes at least one active or trigger element at least partially housed in a cartridge, the cartridge being removably coupled to the peripheral device, the cartridge being selectively removable without requiring tools.

A peripheral device according to one embodiment includes a detection switch, an upper portion, a bottom portion, and a leveling device, the upper portion including a triggering interface and pivotably, fixedly, and/or removably coupled to the bottom portion, the detection switch configured to communicate a signal upon detecting actuation of the triggering interface, the leveling device having an element extending to proximate at least one region of the triggering interface spaced from the switch which triggers the switch when the triggering interface is pressed on the region proximate the element of the leveling device.

A peripheral device according to one embodiment includes a detection switch, at least one triggering interface, and silencing features configured to dampen sound generated when the triggering interface is actuated and/or released.

A peripheral device according to one embodiment includes a triggering interface coupled to a body, a biasing device to aid return of the triggering device, and at least one force adjustment mechanism having a screw and nut configured to compress the biasing member without changing a travel characteristic of the triggering interface.

A peripheral device according to one embodiment includes a triggering interface coupled to a body, a biasing device to aid return of the triggering device, and at least one force adjustment mechanism having concentric threaded cylinders configured compress the biasing member without changing the pedal travel.

DETAILED DESCRIPTION

The present disclosure relates to a novel peripheral device, in one aspect, including an improved foot pedal or foot switch for use with electronic devices which can be configured to perform virtually silently, with adjustable force which does not affect pedal travel, and in which the active elements can be housed in a removable cartridge.

Figure 1:
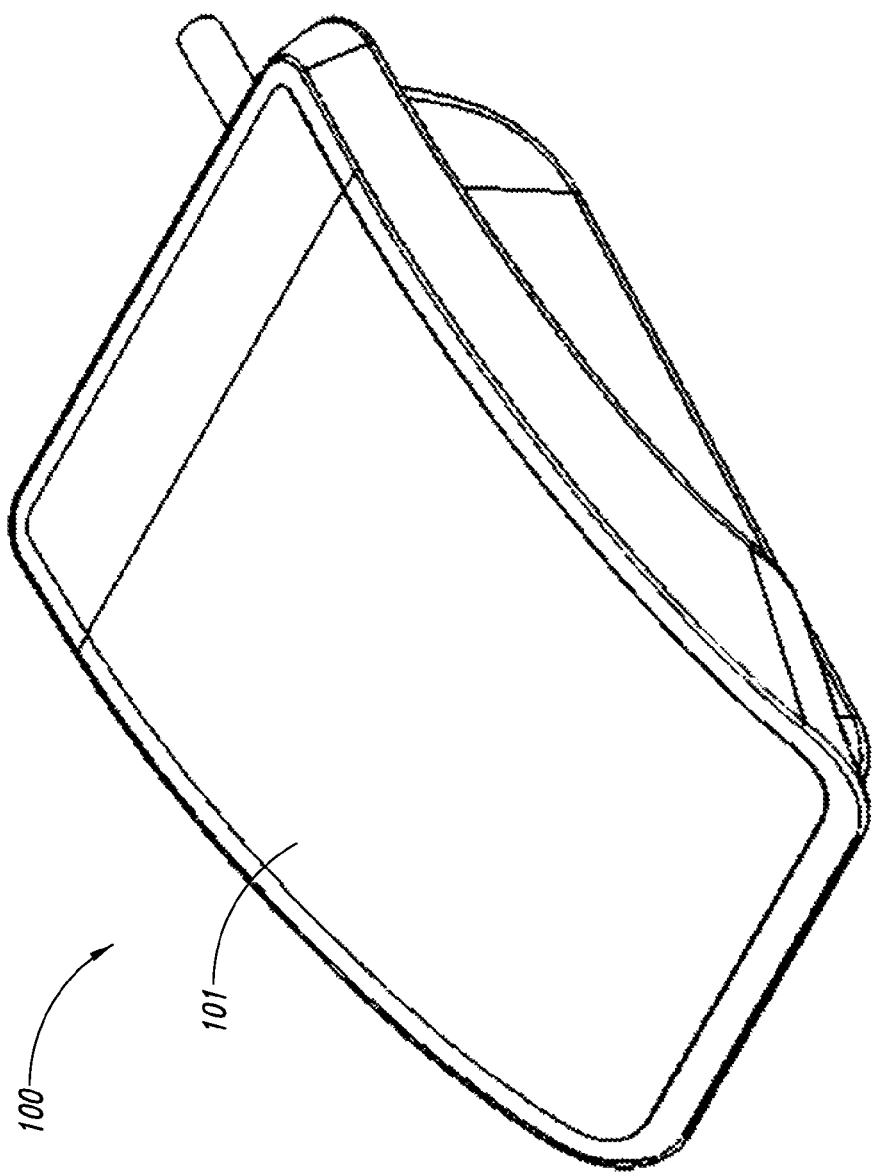
Figure 2:
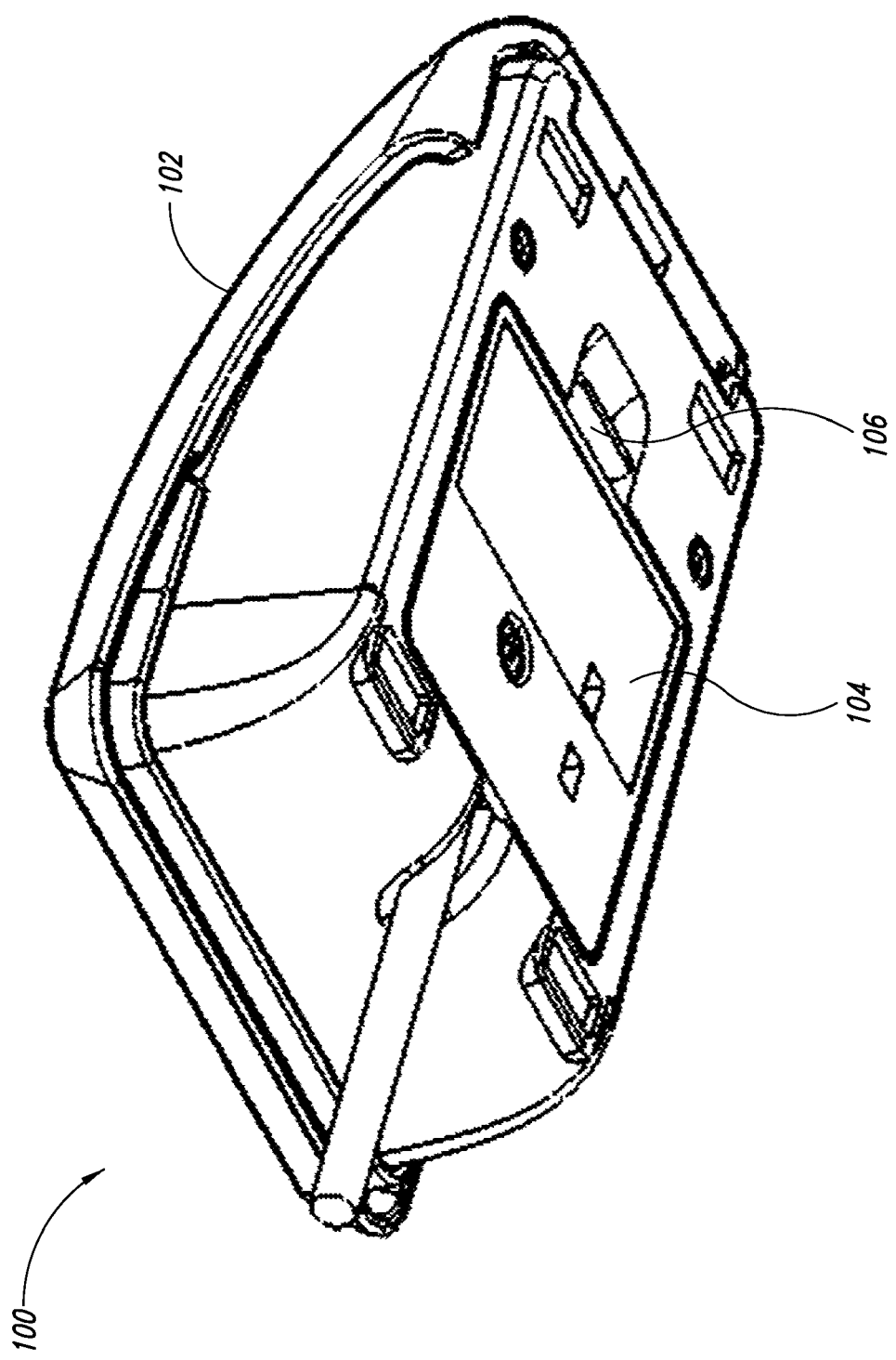
Figure 3:
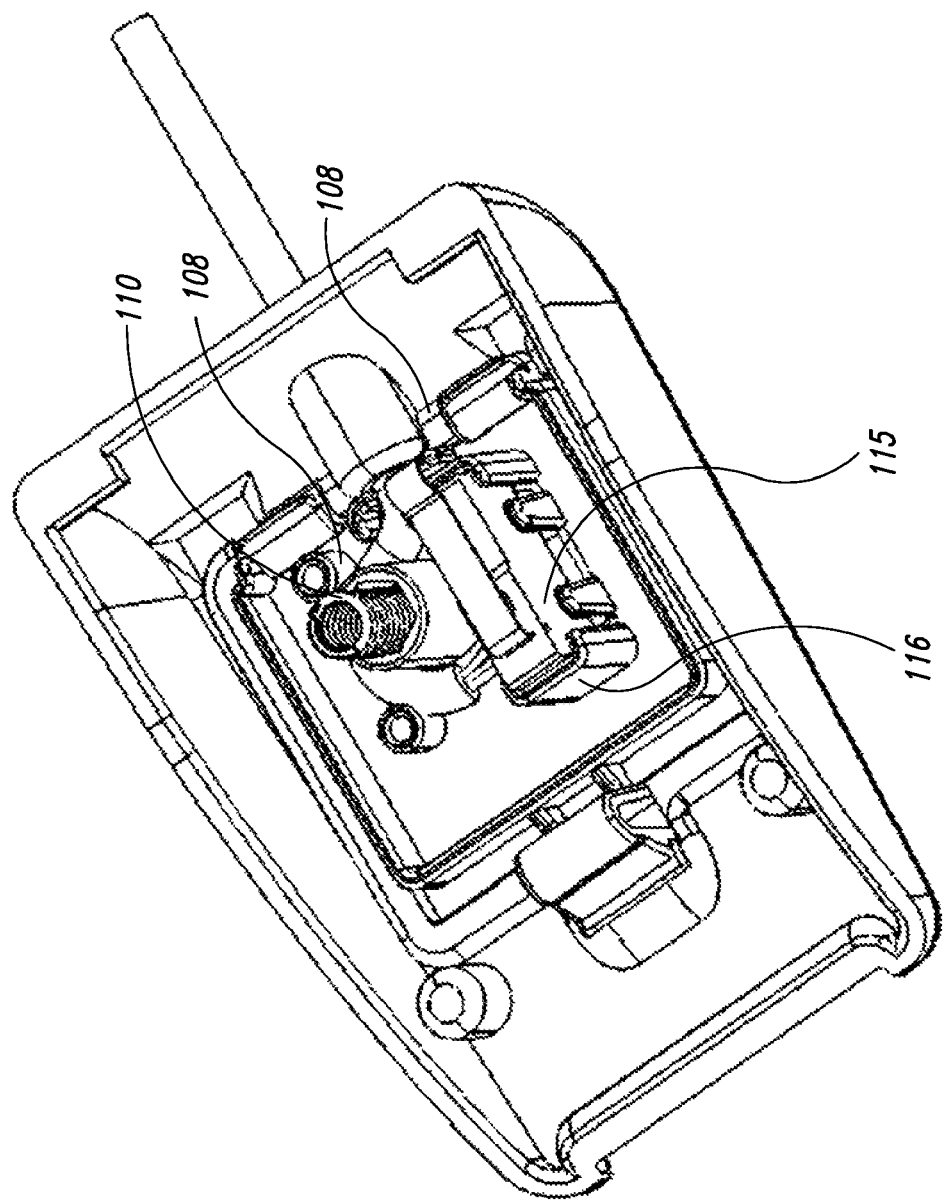
FIG. 3 is a bottom perspective view of a portion of a peripheral device having a removable cartridge at least partially housing a spring as a biasing member and a switch according to one embodiment.
Figure 4:
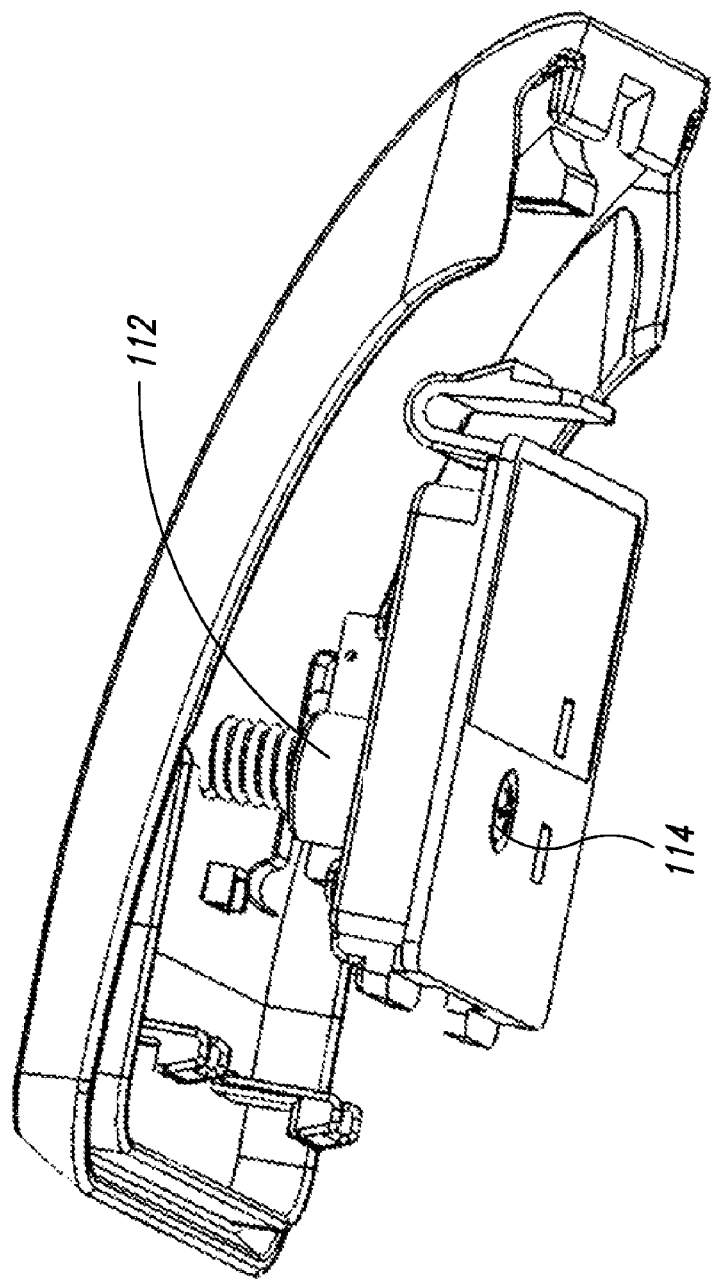
FIG. 4 is an perspective view of a portion of a peripheral device having a removable cartridge including a spring and spring adjustment mechanism, and coupling mechanism for assembling the body of the peripheral device, according to one embodiment.

FIG. 1 illustrates one embodiment of a peripheral device 100 having an upper member 101, all or a portion of which can form one or more triggering interfaces of the peripheral device 100. As illustrated in FIG. 2, the peripheral device 100 includes a body 102 and a cartridge 104 removably coupled to the body 102. The cartridge 104 and/or the body 102 may include a release or detent mechanism or feature 106 that allows easy manual removal of the cartridge 104 without requiring tools. FIG. 3 illustrates the peripheral device 100 with the upper member 101 removed to show an interior of the device according to one aspect. The cartridge 104 can include, house, or be coupled to active elements of the device 100, for example, those which trigger a press event and which provide the pedal force (e.g., resistance and spring-back pressure. In one embodiment, the cartridge 104 is a snap-in cartridge which can be installed or removed without tools. In some embodiments, one or more cable-anchoring features 108 such as a strain relief may also be included in the removable cartridge 102. In one aspect, said cartridge 102 can load from an underside of the peripheral device 100.

Figure 5:
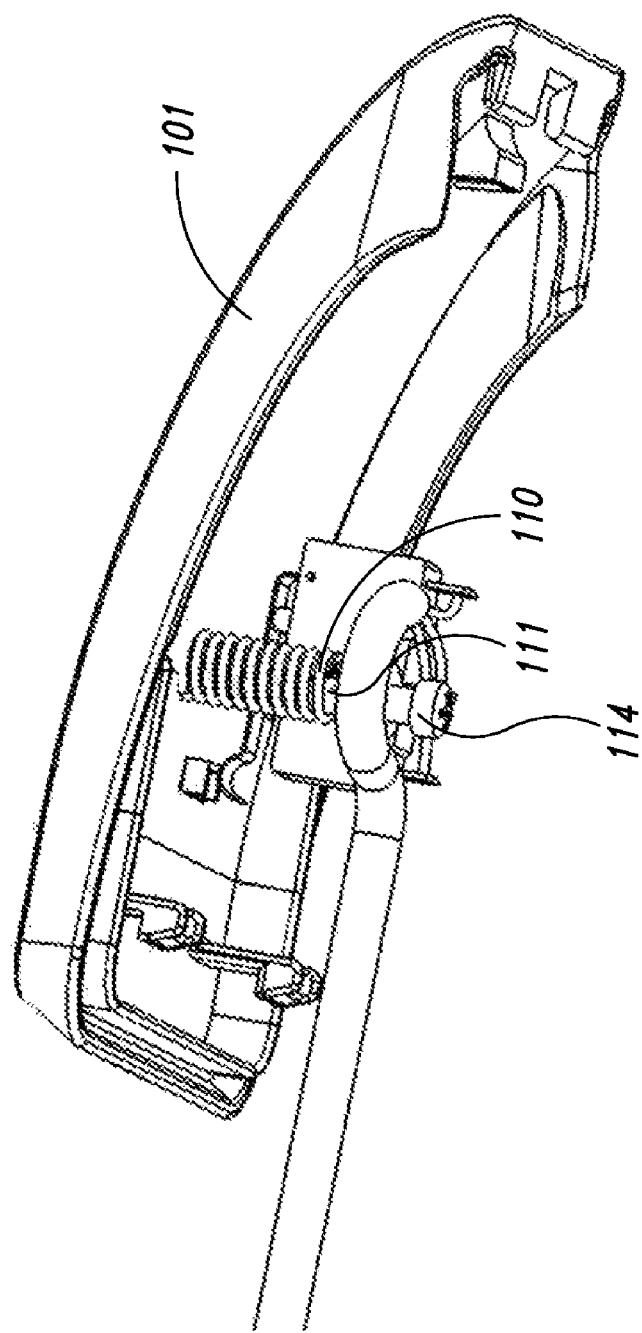
FIG. 5 is an perspective view of a portion of a peripheral device illustrating a pivotable coupling mechanism for coupling body parts of the peripheral device, such its housing, with a removable cartridge housing removed to show a spring, cable and contact rib for a microswitch, all of which can be partially housed in the cartridge housing, according to one embodiment.
Figure 5A:
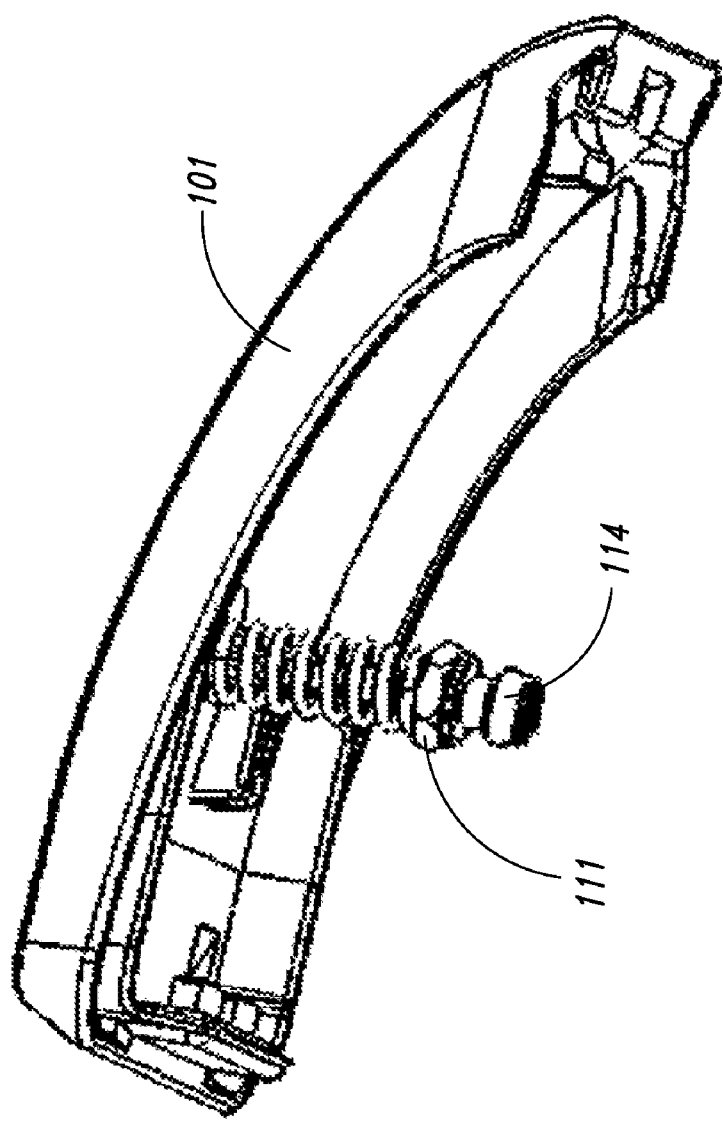
FIG. 5A is a bottom perspective view of an upper member of a peripheral device showing a screw and nut biasing force adjustment mechanism, according to one embodiment.
Figure 6:
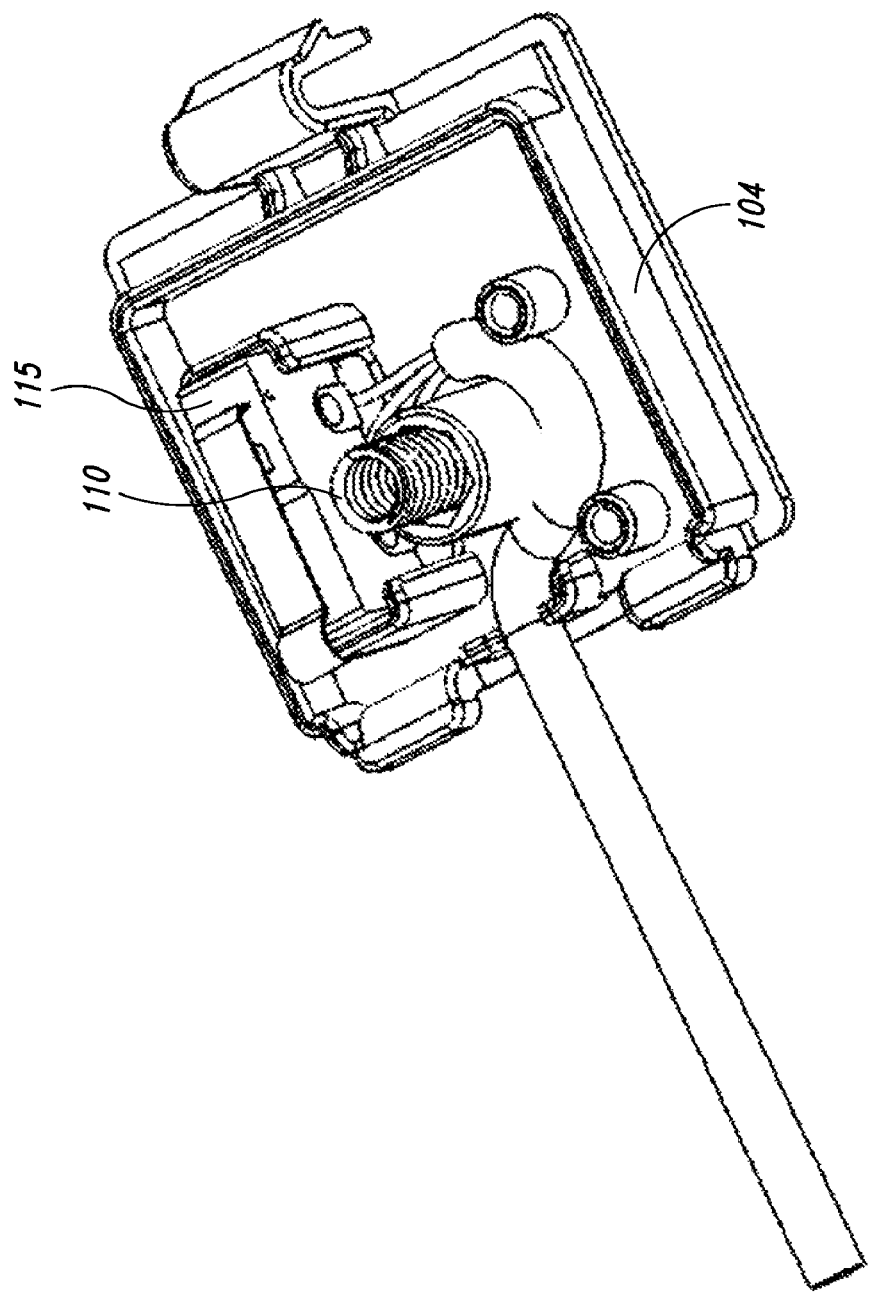
FIG. 6 is a top perspective view of a cartridge that at least partially houses a switch, a cable, and a biasing member, such as a spring, and that can be removably coupled to, or assembled in, a peripheral device, according to one embodiment.

The spring-back force is normally provided by a biasing member 110 such as a spring, for example, a steel and/or coiled spring. In addition, or instead, in other embodiments, a rubber dome may be used to provide a spring-back force. An instrument, structure or feature provided to adjust the biasing force (and thus triggering force) can also be present in the cartridge 104. For example, as illustrated in FIGS. 3-7, a screw 114 and nut 111 (FIG. 5A) may be used to pre-compress the spring, thus effectively increasing the force required to operate the triggering interface, which can include a pedal and/or foot switch, or other suitable triggering interface, without affecting travel distance of the triggering interface. The screw head of the screw 114 can be externally accessible so that no disassembly is required to adjust the spring force. The nut 111 can be secured in a channel or chamber defined by a hollow member 112, such as a hollow cylindrical member.

Figure 21:
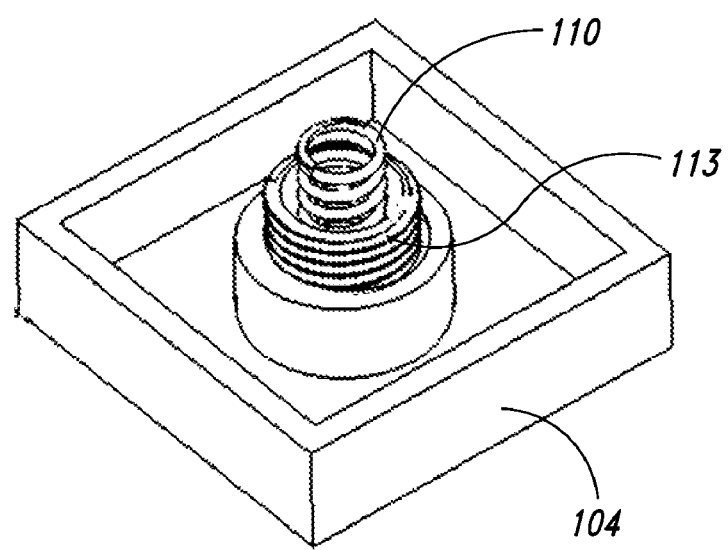
FIG. 21 is a stylized or schematic view of a cartridge having concentric threaded cylinders which provide biasing force adjustment according to one embodiment.
Figure 22:
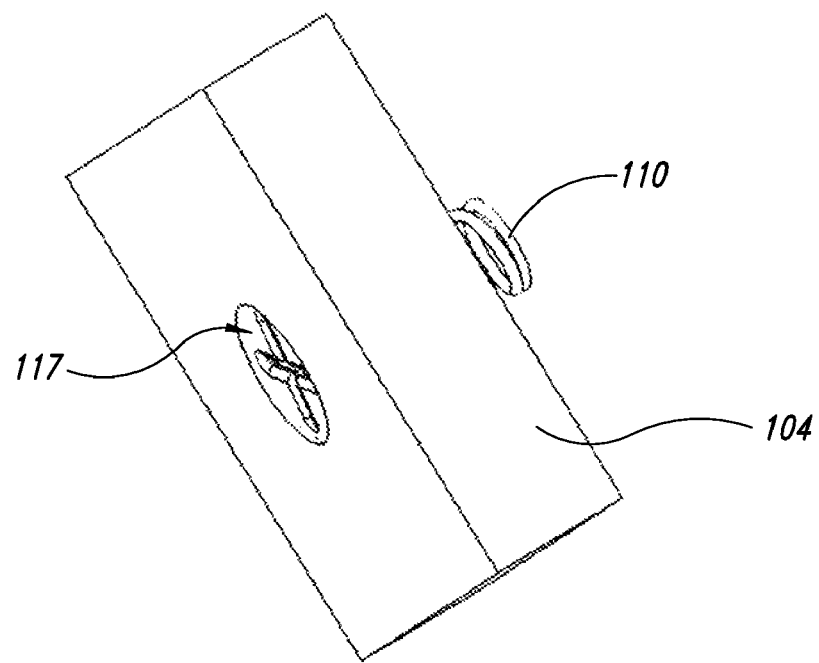
FIG. 22 is an underside perspective view of the cartridge of FIG. 21 according to one embodiment.

Some embodiments may include concentric threaded cylinders for this purpose. In such embodiments as illustrated in FIGS. 21 and 22, a force adjusting member 113, which in some aspects can include a closed-end cylinder, can hold the biasing member 110 and be coupled to the cartridge 104. For example, the adjusting member 113 can be threaded on its outer surface, and engage the inside of a threaded cylinder penetrating the cartridge 104. The outer surface 117 (FIG. 22) of the closed end of the cylinder is formed, configured, or shaped to mate with a tool such as a screwdriver or coin and when turned, the closed-end cylinder travels in the threaded cylinder of the cartridge, either increasing or reducing the spring pressure.

In some embodiments, the outer surface can be configured to allow manual rotation of the cylinder without requiring a tool. For example, the outer surface can be extractable and retractable to allow a user to pull an actuating portion or member that is axially movably coupled to the cylinder to rotatingly move therewith, and rotate the actuating portion or member to rotate the cylinder. Other suitable actuating devices, features, or shapes that facilitate rotation of the cylinder are contemplated to fall within the scope of the present disclosure.

As illustrated in FIG. 3, the cartridge 104 may include, or be coupled to, for example removably coupled to, a detection switch 115, which detects actuation of the triggering interface and electronically communicates a signal corresponding to a function intended by the triggering interface. The cartridge 104 can include a receptacle 116 for removably securing the detection switch 115.

In some embodiments of the triggering interface, which can be a pedal in some aspects, triggering force may be adjusted in a range such as 3 to 6 lbs, measured at a typical contact point for the user's foot, though higher or lower ranges may be easily achieved by changing the spring force. Larger ranges may also be achieved if desirable by changing the length of the threaded portion of either type of mechanism. Furthermore, unlike conventional pedals, in one aspect, the force adjustment member does not change the travel of the triggering interface or pedal within the normal range of adjustment.

Figure 24:
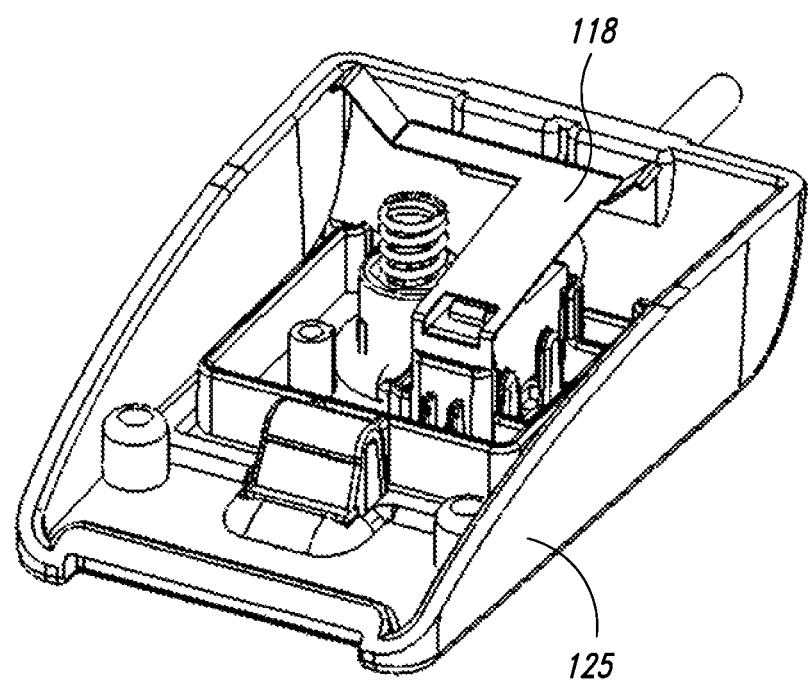
FIG. 24 is a perspective view of an assembled bottom enclosure of a peripheral device with a cartridge having a leveling feature according to one embodiment.
Figure 25:
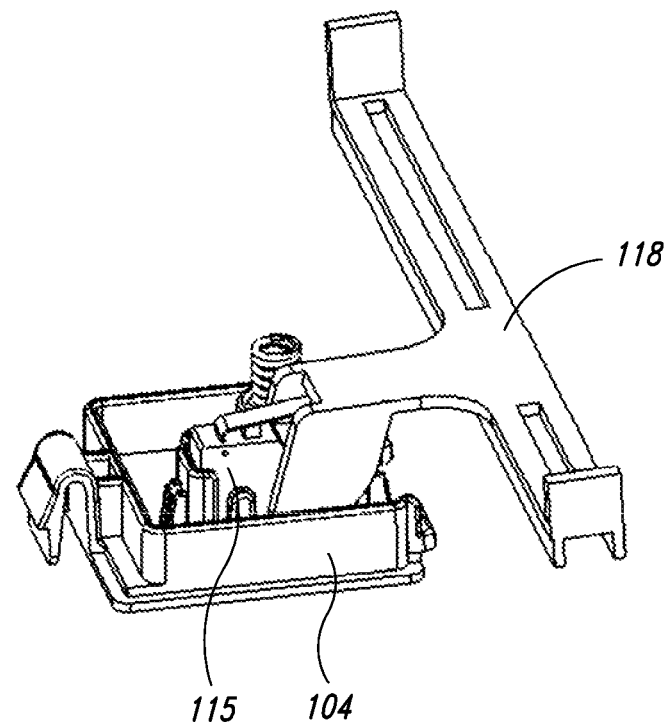
FIG. 25 is a perspective view of an assembled cartridge showing a rocker-style leveling feature according to one embodiment.
Figure 26:
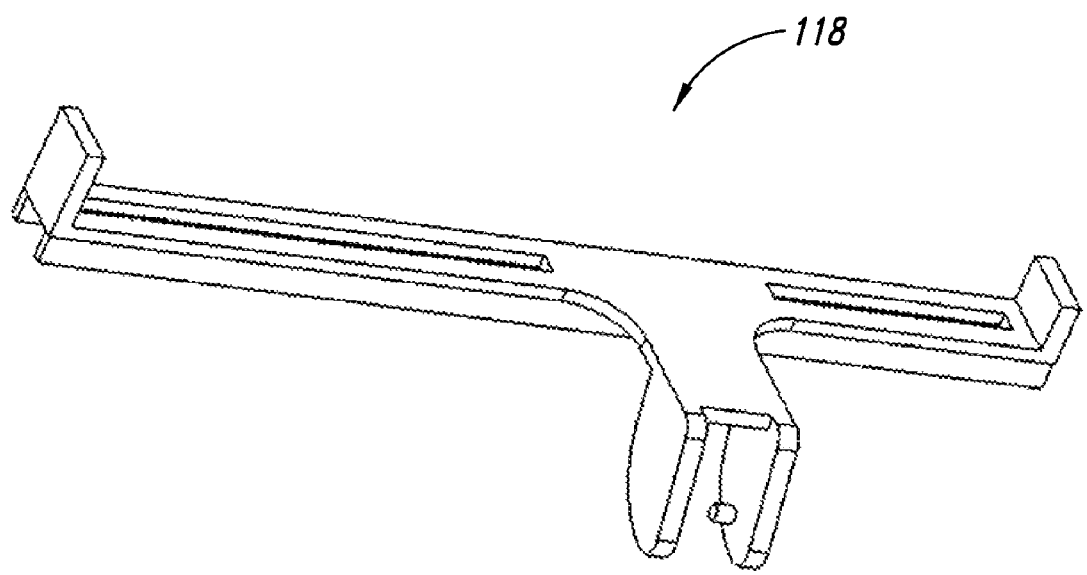
FIG. 26 is a perspective view of the rocker-style leveling feature of FIG. 25.

In some embodiments, especially those which are low-profile and have a short travel distance, the upper portion of the triggering interface may be flexible enough to flex if triggering is attempted on a corner. Corner triggering has been conventionally thought to be impractical due to not adequately depressing the region of the peripheral devices where the trigger is detected. However, according to one embodiment of the present disclosure, as shown in FIGS. 24-25, a leveling device 118 can be included, to trigger the detection switch even when the triggering interface is pressed only the extreme corners.

In some embodiments, the leveling device 118 can include a flexible and/or resilient sheet-metal, such as a leaf spring, formed to attach or be coupled, for example, removably coupled, to or with respect to the detection switch 115 to overlay a trigger region or member of the switch. The leveling device 118 may include stiffened arms, for example in a form of a "T" shape extending to one or more corners of the peripheral device 100, or to any other region where triggering is desired. The leveling device 118 can be optimized to minimally resist bending near a hinge point where it attaches to the cartridge or to the detection switch, but to maximally resist twisting or bending elsewhere. In another embodiment, the leveling device, which can in some aspects be fabricated as a molded plastic device, and/or can be pivotably attached to the cartridge or to the detection switch, and thus move in a rocking motion when the pedal is pressed. The return movement of the leveling device 118 is provided by the inherent spring characteristic in the lever, or may be supplemented by a small coiled spring or living-hinge portion which deflects when the pedal is pressed.

In some embodiments, electronic circuitry may be incorporated in the leveling device to facilitate communication of different signals through the detecting switch 115, corresponding to distinct desired actions upon triggering different corners or regions of the triggering interface, respectively.

In one embodiment, the cartridge 104 contains some or all of the active elements, such as a circuit board and electronic components, necessary to perform special functions such as wireless communication with a computer, and/or emulating a USB device, and/or including a memory chip or other mechanism allowing the programming and storing of special actions in the on-board electronics.

Figure 7:
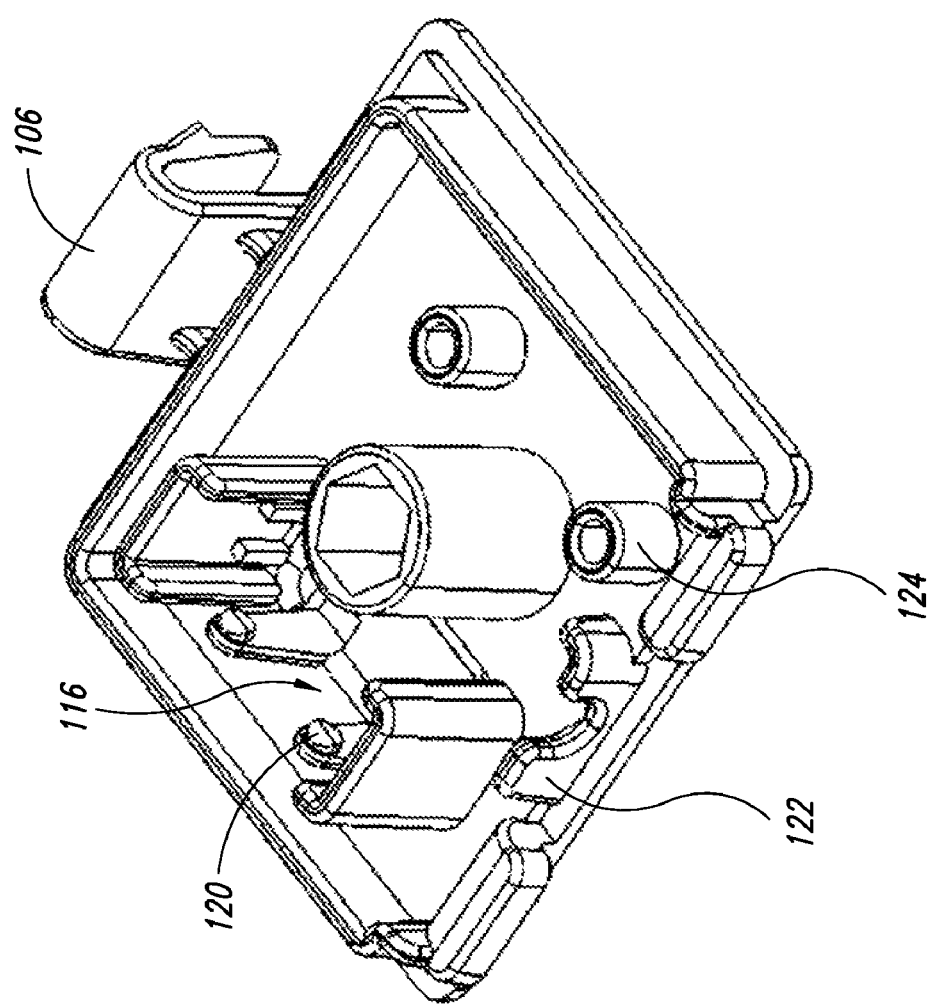
FIG. 7 is a top perspective view of a cartridge having a coupling mechanism, such as a snap, for removably coupling the cartridge to a peripheral device, and that at least partially houses a switch anchor, spring and spring adjusting mechanism, a cable channel and a cable strain relief boss, according to one embodiment.
Figure 8:
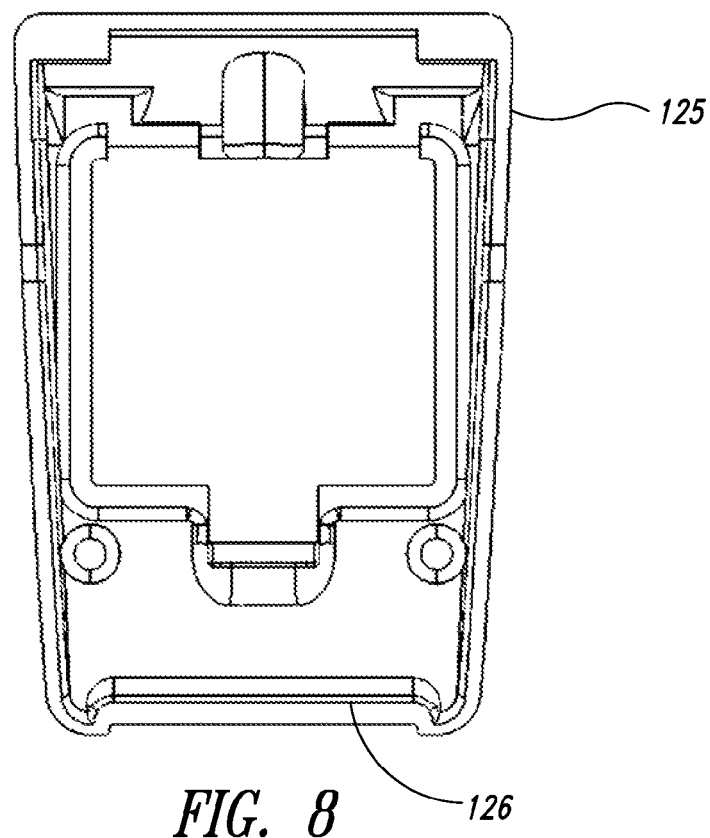
FIG. 8 is a top view of a body portion of a peripheral device having a region configured to hingedly coupled to a different body portion, and a coupling area or mechanism, such as an opening for removably receiving or removably coupling to a cartridge housing other elements, such as electronic or structural elements used by a user of the peripheral device, according to one embodiment.
Figure 9:
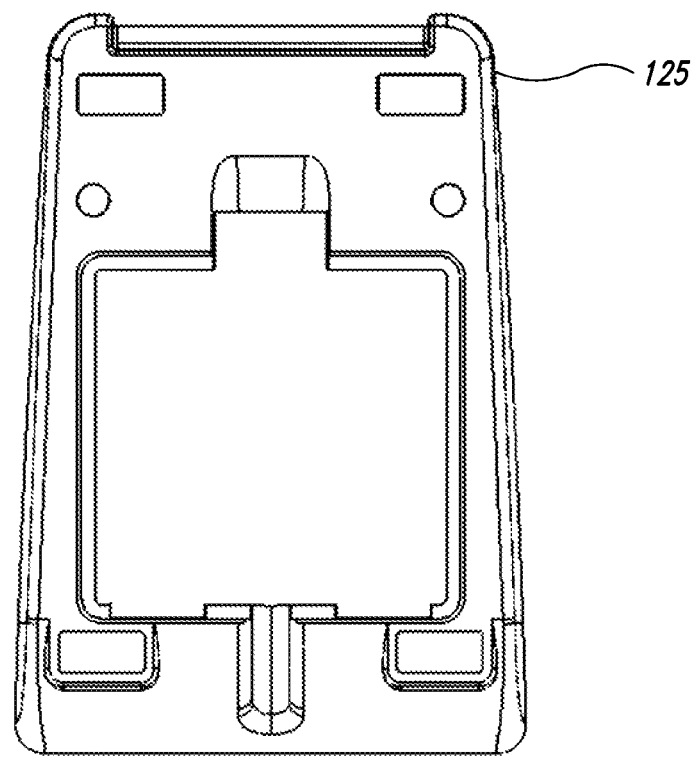
FIG. 9 is a top view of a body portion of a peripheral device having a region or a feature, such as a channel for receiving and/or routing a cable, and a coupling area or mechanism, such as an opening for removably receiving or removably coupling to a cartridge housing other elements, such as electronic or structural elements used by a user of the peripheral device, according to one embodiment.
Figure 10:
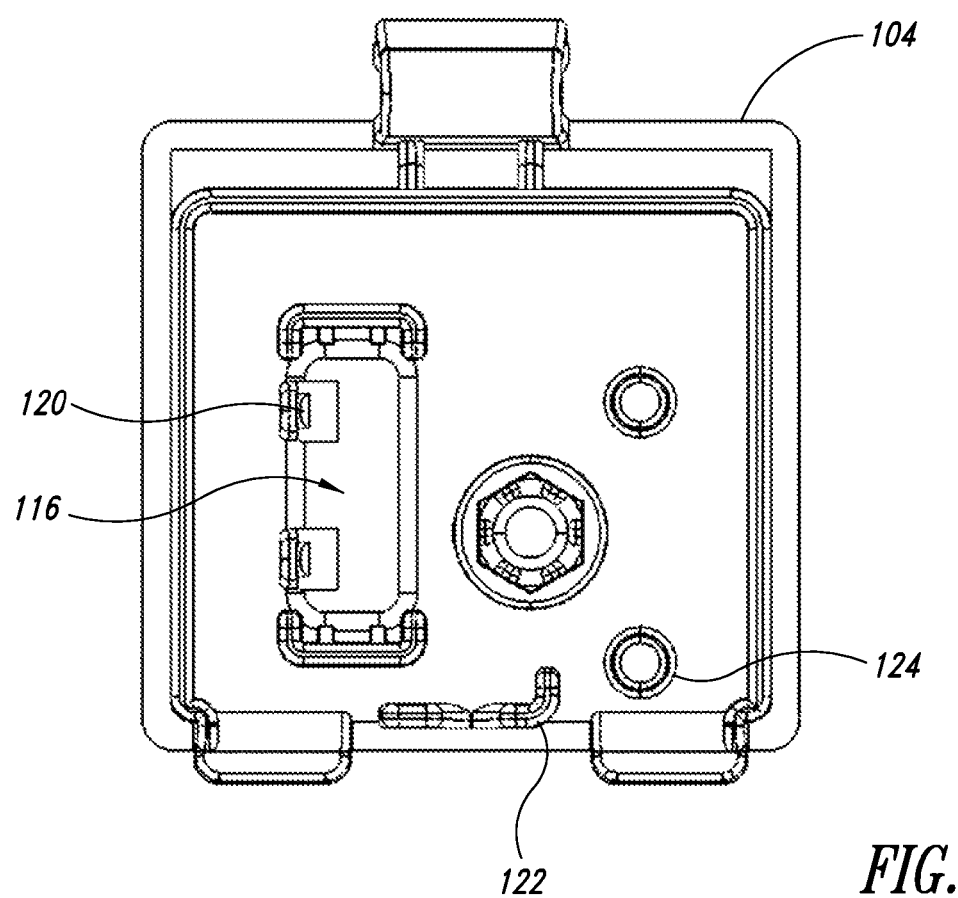
FIG. 10 is a top view of a portion of a cartridge configured to be removably coupled to a peripheral device, and having a coupling mechanism for being coupled to a switch, such as a snap-in receptacle, and bosses for cable strain-relief and spring and adjustment mechanism, according to one embodiment.
Figure 11:
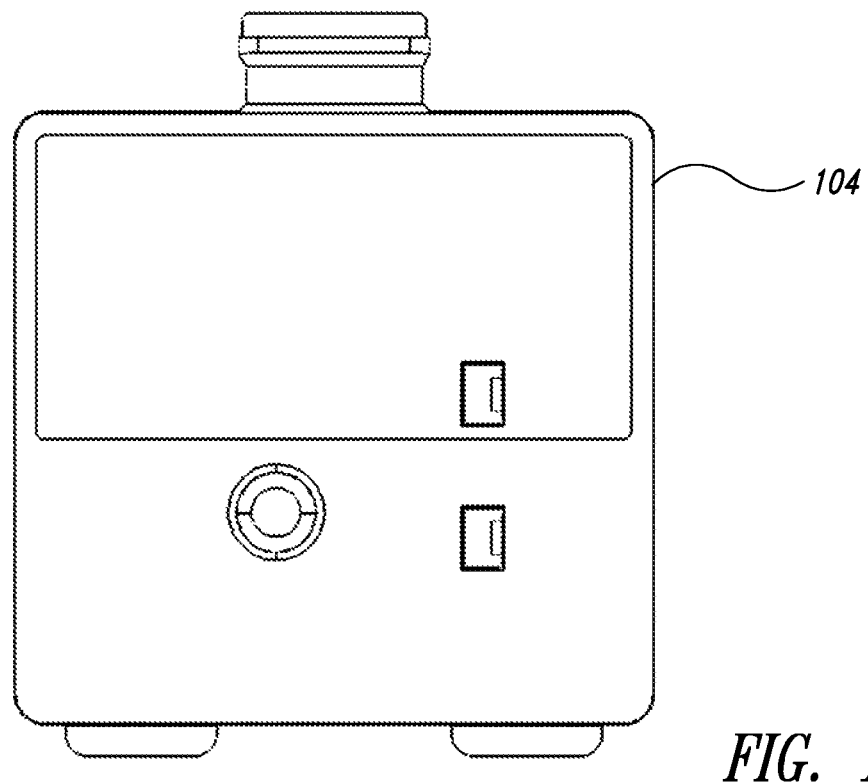
FIG. 11 is a bottom view of a cartridge configured to be removably coupled to a peripheral device, and having a coupling mechanism, such as a snap, for removably coupling the cartridge to a peripheral device, and a receiving structure, such as a hole for spring tension adjusting mechanism, a cable channel and a cable strain relief boss, according to one embodiment.
Figure 12:
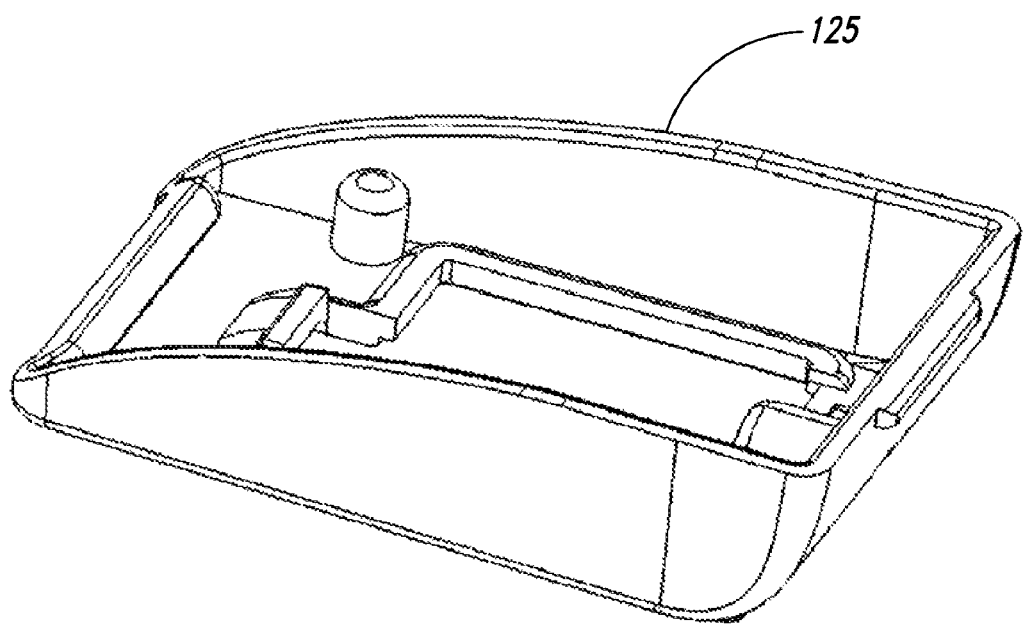
FIG. 12 is a bottom perspective view of a body portion of a peripheral device having a coupling feature such as a snap element for coupling to a different body portion of the peripheral device, according to one embodiment.
Figure 13:
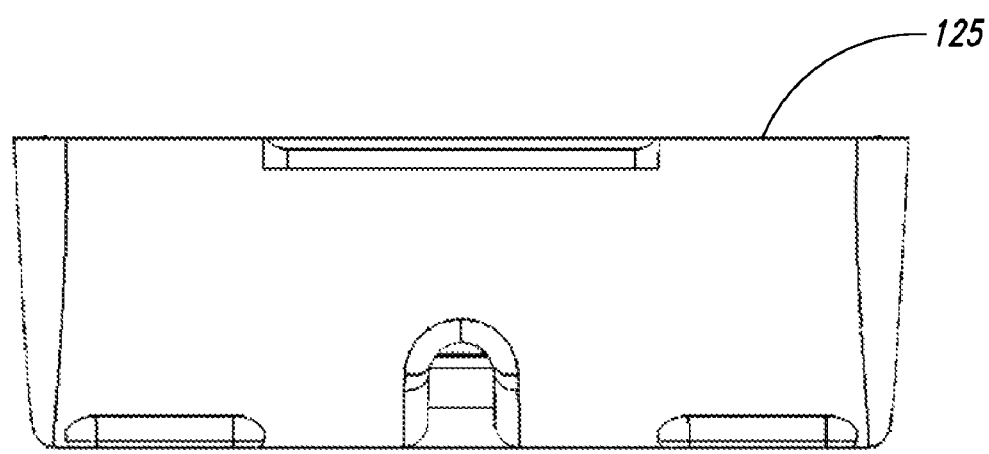
FIG. 13 is an end view of the body portion of FIG. 12.
Figure 14:
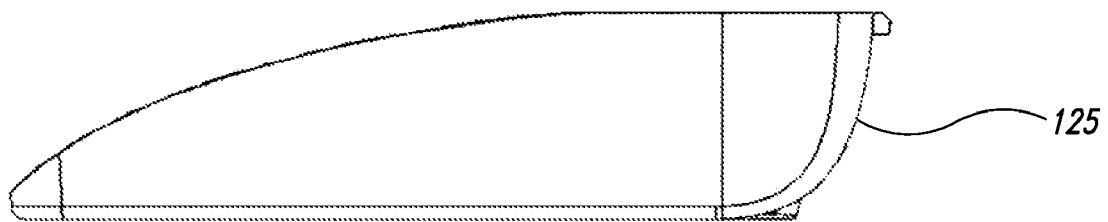
FIG. 14 is a side view of the body portion of FIG. 12.
Figure 15:
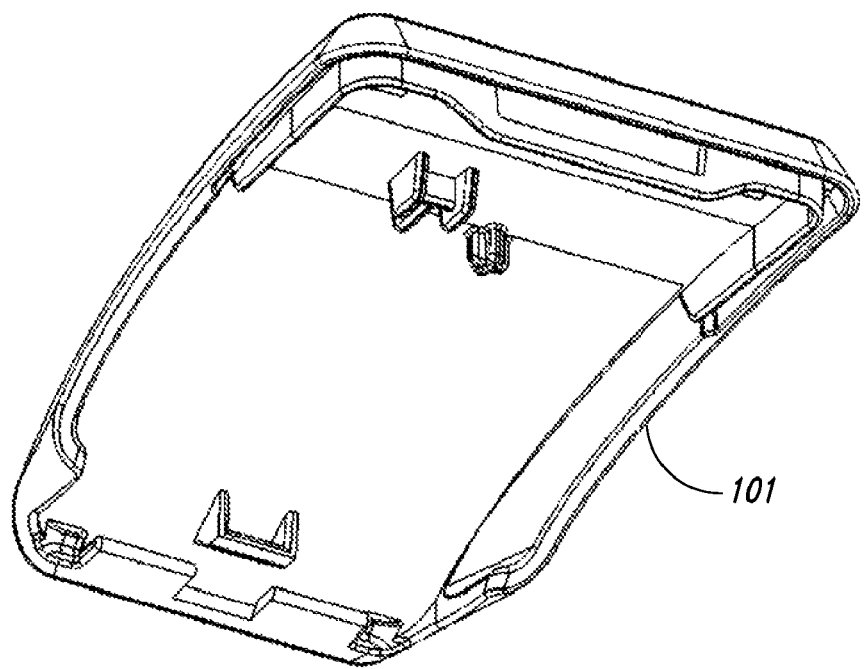
FIG. 15 is a bottom perspective view of another body portion of a peripheral device having a coupling feature such as a snap element for coupling to to the body portion of FIG. 12, according to one embodiment.
Figure 16:
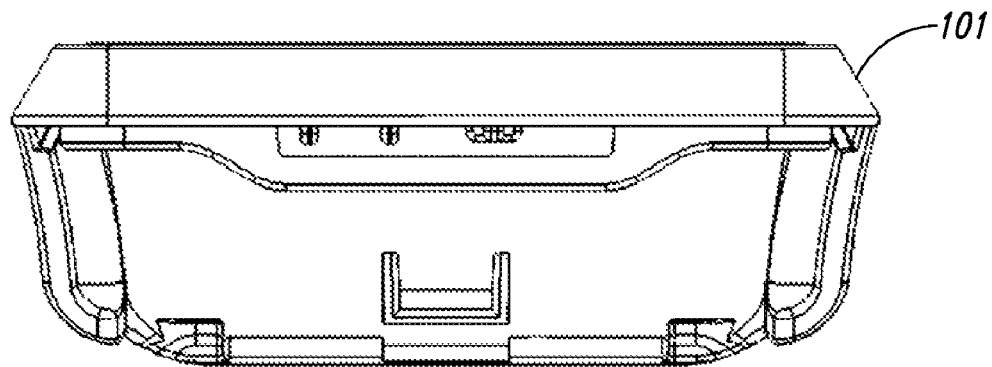
FIG. 16 is an end view of the body portion of FIG. 15.
Figure 17:
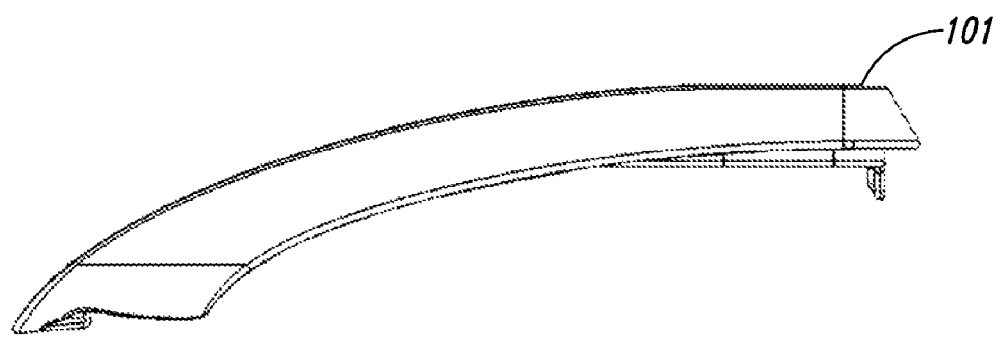
FIG. 17 is a side view of the body portion of FIG. 15.

FIGS. 7-17 illustrate various views of portions of the peripheral device 100 and/or cartridge 104 according to some embodiments. These figures illustrate various coupling features, which support a modular construction of the peripheral device 100 to further facilitate easily removal of separate portions of the device, for example for easy and fast cleaning, repair, or replacement. For example, as illustrated in FIGS. 7 and 10, the switch receptacle 116 can include anchors 120 that securely and removably receive the detection switch 115. The anchors 120 can be coupled to resilient legs to facilitate snapping the switch 115 in place and easily removing the switch, if needed. Furthermore, cable channel and strain relief bosses 122, 124, facilitate efficient routing and securing of a cable.

As illustrated in FIGS. 8 and 9, in some embodiments, a bottom enclosure 125 of the body 102 can include a hinge surface or member 126 for being hingedly coupled to the upper member 101. The bottom enclosure 125 may further include at least a portion of an opening or space in or to which the cartridge 104 is removably coupled.

FIGS. 12-17 illustrate different views of the upper member 101 and bottom enclosure 125, according to an embodiment, in which snap elements are provided to facilitate easy coupling and decoupling of the upper member 101 and bottom enclosure 125, without requiring a tool.

Figure 18:
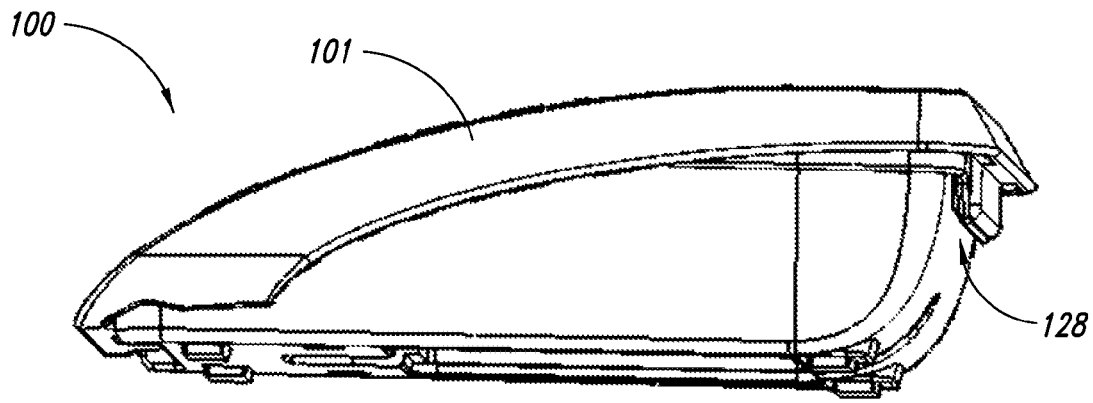
FIG. 18 is a side-rear perspective view of a peripheral device showing an engagement location of upstroke silencing pads, according to one embodiment.
Figure 19:
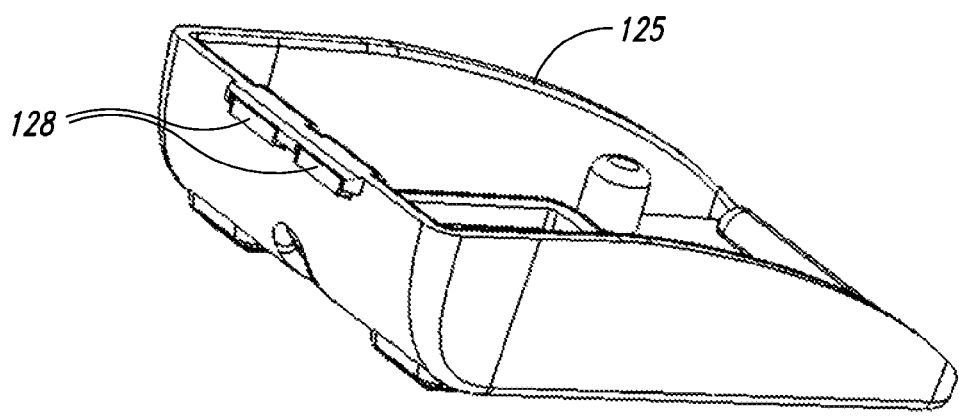
FIG. 19 is a top-rear perspective view of a bottom enclosure of the peripheral device of claim 18 showing upstroke silencing pads according to one embodiment.
Figure 20:
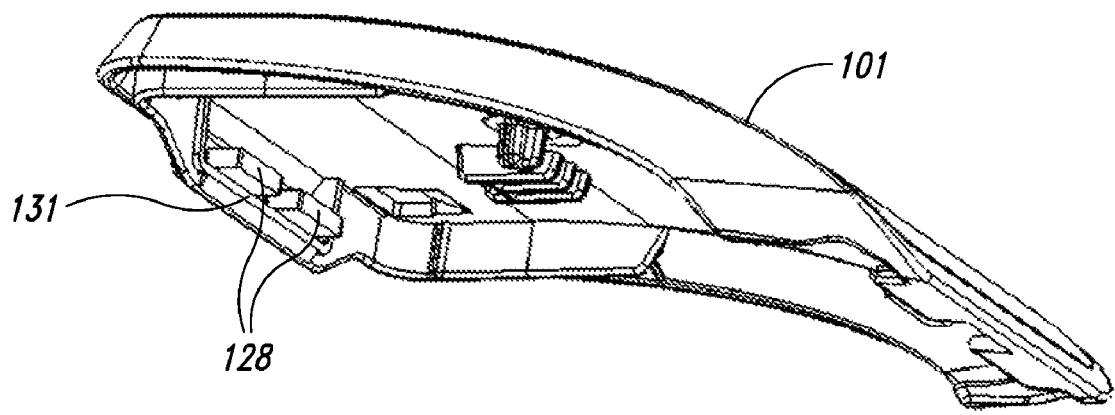
FIG. 20 is an underside perspective view of an upper member of the peripheral device of claim 18 showing a stop region or location of the upstroke silencing pads according to one embodiment.

As illustrated in FIGS. 18-20, in some embodiments, at least one of the upper member 101 and/or bottom enclosure 125 may include at least one upstroke silencing pad 128 and a first pad contact member 130. The first pad contact member 130 contacts the pad 128, which can include sound-dampening properties such as elasticity, to substantially mute the sound of a triggering interface upstroke. The pads 128 in FIG. 20 are shown with the bottom enclosure 125 removed for clarity of illustration.

Figure 23:
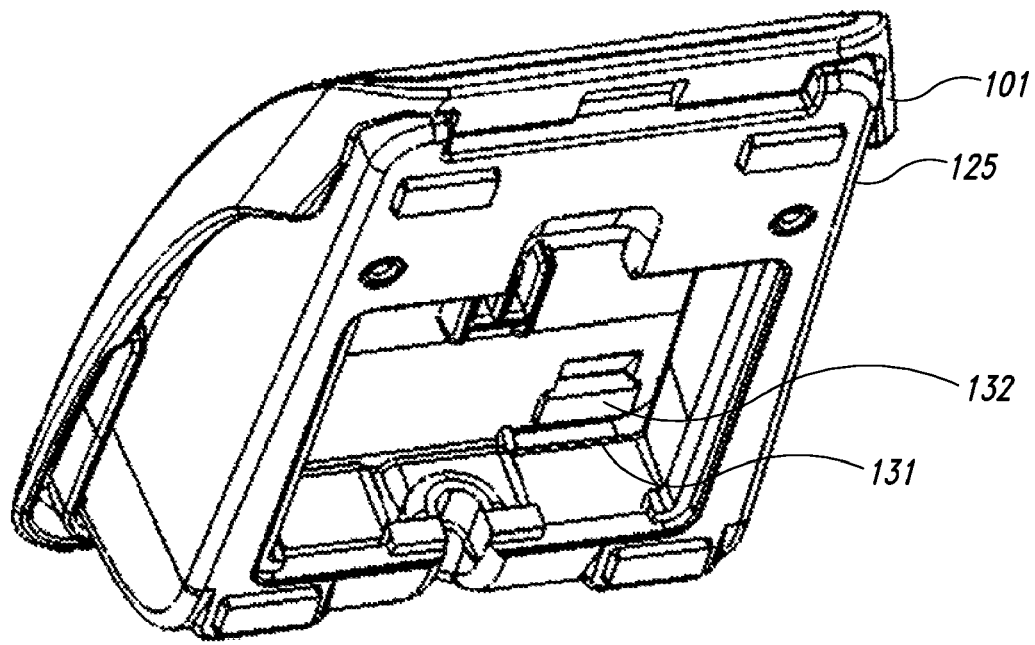
FIG. 23 is an underside perspective view of an upper member of a peripheral device showing a downstroke silencing pad according to one embodiment.

As illustrated in FIG. 23, in some embodiments, at least one of the upper member 101 and/or bottom enclosure 125 may include at least one downstroke silencing pad 132, which can be positioned or configured to contact a portion of the second pad contact member 131. The pad 132 can be include sound-dampening properties, to substantially mute the sound of a down stroke as the upper member contacts the lower member when the pedal hits its end of travel.

In some embodiments, the pads 128, 132, contact member 130, and/or contact member 131 can include a sound-dampening material such as a foam, rubber, silicone, cork, any combination thereof, or other suitable sound-dampening material or feature. The illustrated embodiments are provided as an example of the silencing features of the present disclosure, and in other embodiments, the silencing pads and/or contact members can be positioned differently. Furthermore, contact members can be a portion of the upper member or bottom enclosure, or other component or structure.

Advantages of the new design include easy manufacturing of different pedals with different switches, cable types, and/or spring forces using a common pre-assembled pedal. Switches of different types (quiet vs. audible click, sealed vs. non-sealed) and springs having varying spring constants can be respectively installed as the final assembly step. Advantages to the user include having a silent, low-profile device which is more ergonomic (requiring less bending of the foot when resting and when triggering), plus the ability to install, change, clean, repair or adjust various elements. No known conventional device has configured a foot pedal which has all the active elements in a removable module or cartridge, or is silent, is low-profile and self-leveling, or has a self-contained force-only adjustment mechanism.

One of ordinary skill in the art will appreciate that a cartridge according to the present disclosure is easily removable, a user being able to easily remove it with minimal or no instructions or tools in order to check, clean, or change the switch and/or spring, or any other component mounted to the cartridge. The pedal of the present disclosure can be separately assembled in a way that maintains its hingable motion and no compromises are needed to make it easy to disassemble, while at the same time very strong. Since the switch is particularly prone to wear out with time, this also greatly extends the working life of the product compared to a product requiring more skill for disassembly and assembly. Since foot pedals are used on the floor, they are subject to more dirt and environment damage than a typical keyboard or mouse, so the ability to easily replace the switch and/or spring is very beneficial.

An additional benefit of this approach is that a manufacturer could afford to use a less expensive switch with a shorter life rating, knowing that it will have an adequate life. If the switch fails prematurely for some reason, it can easily be repaired in the field using a replacement switch or switch-cable assembly provided by the manufacturer or a third party.

With the cartridge approach, large quantities of the basic pedal assembled with an empty cartridge, for example with the spring (and with the optional force adjusting screw/nut if the latter is used), can be ordered from one supplier. At the time of final assembly, a user or third party can easily remove the cartridge, for example, snap it out of place, which is much easier than prying open a pedal, and insert appropriate switch/cable assembly, then snap the cartridge back into the pedal.

It is noted that the present disclosure can also apply to other peripheral devices, such as keyboards and mouses. For example, a wired keyboard model could be converted to wireless, or a USB hub could be added, by the purchase and installation of an appropriate cartridge or cartridge element.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A foot pedal peripheral device usable with a computer system, the foot pedal peripheral device comprising:
    a body including a depressible pedal element; and
    a cartridge having at least one active or trigger element at least partially housed in the cartridge, the cartridge being removably coupled to the body of the foot pedal peripheral device such that the cartridge is selectively removable from the body without requiring tools.

2. The foot pedal peripheral device of claim 1 wherein the at least one active or trigger element includes a biasing member to bias the depressible pedal element toward an initial position.

3. The foot pedal peripheral device of claim 1 wherein the cartridge is removably mounted to an underside of the body.

4. The foot pedal peripheral device of claim 2, further comprising:
    an adjustment device for adjusting a parameter of the biasing member to vary a resistance of the depressible pedal element to movement.

5. The foot pedal peripheral device of claim 1 wherein the cartridge includes a coupling member to removably couple the cartridge within a cavity of the foot pedal peripheral device beneath the depressible pedal element.

6. The foot pedal peripheral device of claim 1 wherein the body comprises:
    an upper body forming the depressible pedal element; and
    a lower body hingedly coupled to the upper body.

7. A foot pedal peripheral device usable with a computer system, the foot pedal peripheral device comprising:
    a bottom portion;
    an upper portion coupled to the bottom portion and including a triggering interface;
    a detection switch operable with the triggering interface of the upper portion, the detection switch configured to communicate a signal upon detecting actuation of the triggering interface; and
    a leveling device positioned between the upper portion and the bottom portion, the leveling device having an element extending to proximate a remote region of the triggering interface spaced from the detection switch near an outer periphery of the upper portion and being configured such that the element triggers the detection switch when the triggering interface is pressed on the remote region.

8. A foot pedal peripheral device usable with a computer system, the foot pedal peripheral device comprising:
    a depressible pedal element;
    a detection switch positioned beneath the depressible pedal element and configured to communicate a signal upon detecting actuation of the depressible pedal element; and
    silencing features configured to dampen sound generated when the depressible pedal element is actuated toward a depressed position and/or released to return to an initial position.

9. A foot pedal peripheral device comprising:
    a body portion;
    a depressible pedal element coupled to the body portion;
    a biasing member to aid return of the depressible pedal element to an initial position after being moved to a depressed position by a user; and
    at least one force adjustment mechanism having a screw and nut configured to compress the biasing member without changing a pedal travel characteristic of the depressible pedal element.

10. A foot pedal peripheral device comprising:
    a body portion;
    a depressible pedal element coupled to the body portion;
    a biasing member to aid return of the depressible pedal element to an initial position after being moved to a depressed position by a user; and
    at least one force adjustment mechanism having concentric threaded cylinders configured to compress the biasing member without changing a pedal travel characteristic of the depressible pedal element.

* * * * *